United States Patent [19]

Spencer et al.

[11] Patent Number: 4,528,493
[45] Date of Patent: Jul. 9, 1985

[54] DETECTOR FOR SHORTED ROTATING DIODE OF A BRUSHLESS ALTERNATOR

[75] Inventors: William Spencer, Rockford; Melvin C. Jackovich, Stillman Valley, both of Ill.

[73] Assignee: Sundstrand Corporation, Rockford, Ill.

[21] Appl. No.: 554,945

[22] Filed: Nov. 25, 1983

[51] Int. Cl.³ .............................................. H02H 7/06
[52] U.S. Cl. ............................ 322/99; 324/158 MG; 361/21
[58] Field of Search ............. 322/28, 73, 99; 361/20, 361/21, 85, 93; 324/158 MG

[56] References Cited

U.S. PATENT DOCUMENTS

| | | | |
|---|---|---|---|
| 3,534,228 | 10/1970 | Hyvarinen et al. | 322/28 X |
| 3,705,331 | 12/1972 | South et al. | 361/20 |
| 4,041,369 | 8/1977 | King et al. | 322/99 |
| 4,178,546 | 12/1979 | Hulls et al. | 322/99 X |
| 4,348,629 | 9/1982 | Sievers | 322/99 |

Primary Examiner—R. J. Hickey
Attorney, Agent, or Firm—Wood, Dalton, Phillips, Mason & Rowe

[57] ABSTRACT

A circuit for detecting the occurrence of a shorted diode in the rotating rectifier of a brushless alternator. A comparator has connected to it signals representing the base drive to the voltage regulator output transistor and the voltage at the terminal of the generator field winding connected with the collector-emitter circuit of the output transistor. The occurrence of a field winding terminal voltage of the order of the voltage at the anode of the diode which shunts the voltage regulator output transistor, in the absence of a drive signal to the transistor, indicates that there is a shorted rectifier diode.

12 Claims, 4 Drawing Figures

DETECTOR FOR SHORTED ROTATING DIODE OF A BRUSHLESS ALTERNATOR

DESCRIPTION

1. Field of the Invention

This invention relates to a circuit for detecting the occurrence of a shorted diode in the rectifier of the rotating exciter of a brushless alternator.

2. Background of the Invention

A typical brushless alternator has an exciter field winding which is a part of the stator structure of the machine. The rotor of the alternator includes an exciter armature in which an alternating output is developed. A rectifier which is a part of the rotor is connected with the exciter armature and provides direct current excitation for the main field winding. The alternator output is developed in the stator armature windings. The exciter field is connected through a regulator transistor with a DC source. A diode shunts the transistor. A voltage regulator circuit provides a pulse width modulated drive signal to the regulator transistor in accordance with the output voltage of the alternator.

A failed diode in the rotating rectifier causes malfunctioning of the regulator and must be detected to avoid damage to the system. Prior circuits have, for example, responded to the frequency and amplitude of the ripple current in the field winding, Calfee et al. U.S. Pat. No. 3,210,603 and Hyvarinen U.S. Pat. No. 3,534,228, or compared the exciter field current with the alternator output, South U.S. Pat. No. 3,705,331.

SUMMARY OF THE INVENTION

The present invention provides a rotating shorted diode detector which does not rely on analog sensing of exciter field current or exciter field current ripple.

More particularly, it is a feature of the invention that the shorted diode rectifier detector includes means for comparing the voltage at the base of the voltage regulator transistor with the voltage at the terminal of the stator field winding which is connected with the collector-emitter circuit of the voltage regulator transistor. The occurrence of a voltage at the field winding terminal which is of the order of the voltage at the anode of the shunt diode, in the absence of a drive signal to the base of the voltage regulator transistor indicates the occurrence of a shorted diode.

Another feature is that the detector includes a first inverter connected with the stator field winding terminal, a second inverter connected with the voltage regulator transistor base and an AND gate having two inputs, one connected with the output of each of the inverters. The output of the AND gate is high only upon the occurrence of a low voltage at the field winding terminal in the absence of a drive signal to the base of the regulator transistor, indicating the occurrence of a shorted diode rectifier.

Further features and advantages of the invention will be apparent from the following specification and from the drawings.

DETAILED DESCRIPTION OF THE INVENTION

Figure 1:
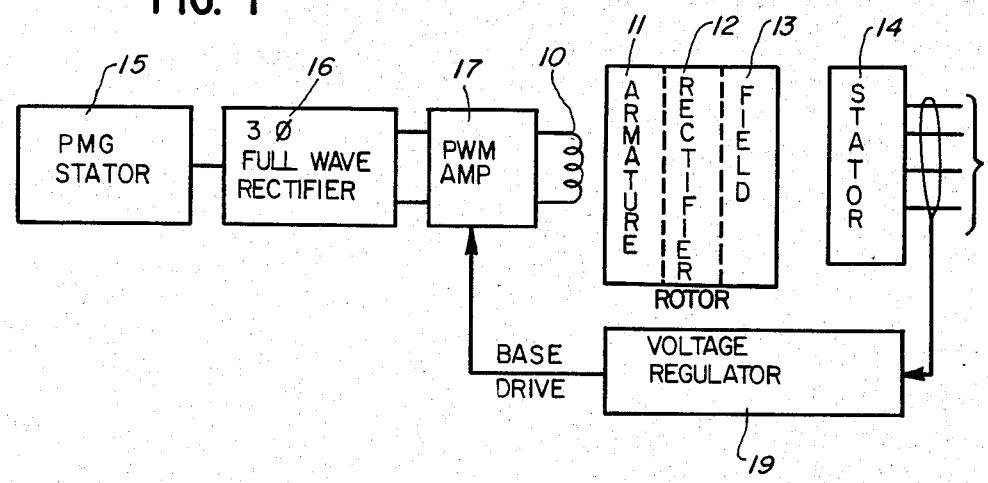
FIG. 1 is a block diagram of a brushless alternator illustrating the system in which the detector is used.

A brushless alternator system, elements of which are shown diagrammatically in FIG. 1, has an exciter with a stationary field winding 10. The rotor of the machine is driven by a prime mover (not shown) and includes an exciter armature winding 11 in which an alternating voltage, typically three phase, is generated. A rectifier 12 is connected with the armature and provides DC current to the main alternator field winding 13. Rectifier 12 is typically a three phase, full wave rectifier using six semiconductor diodes. The alternator output is developed in stator 14, providing three phase power to a load (not shown).

Power for the exciter field is, in the system illustrated, developed in the stator winding 15 of a permanent magnet generator (PMG) which has a permanent magnet (not shown) mechanically a part of the main machine rotor. The three phase output of the PMG is connected with a three phase full wave rectifier 16 which provides DC power to a pulse width modulated amplifier 17 that controls the current to exciter field winding 10. Voltage regulator 19 is responsive to the output voltage of the main machine providing an appropriate base drive signal to pulse width modulated amplifier 17.

Figure 2:
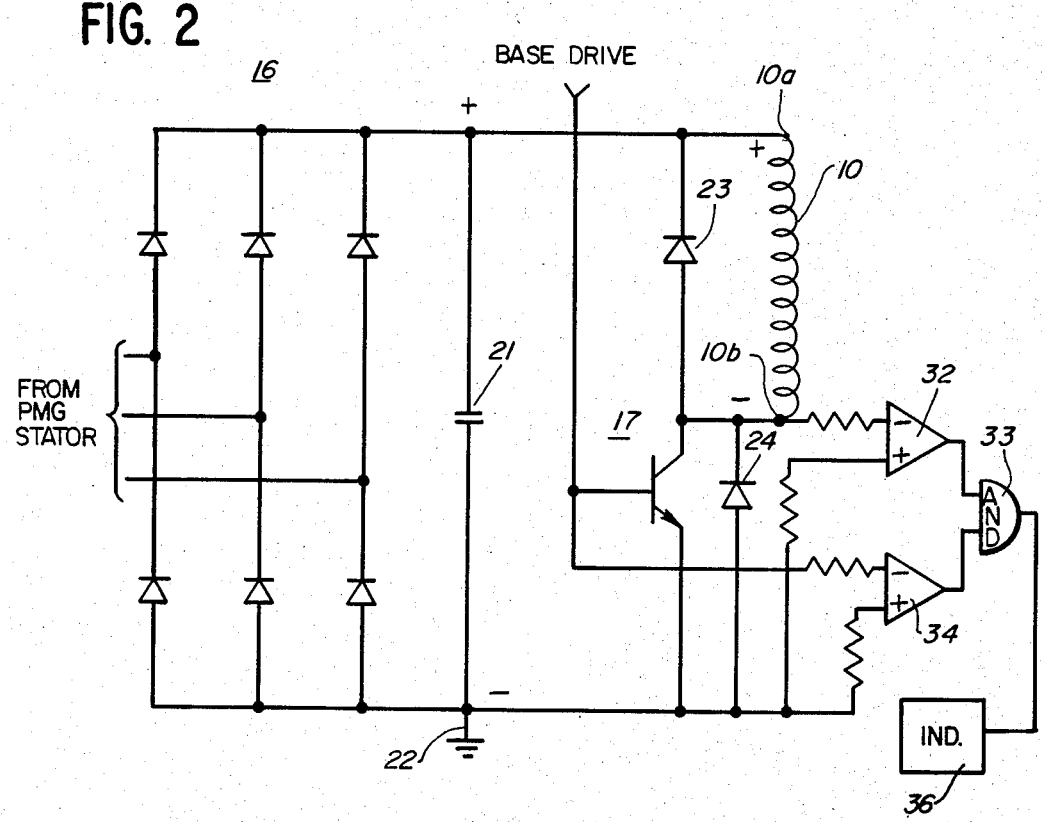
FIG. 2 is a schematic diagram of the field circuit of the brushless alternator and the shorted diode rectifier detector.

Turning now to FIG. 2, the three phase output from the PMG stator is connected with three phase full wave diode rectifier 16 which has a filter capacitor 21 connected across the rectifier output, providing a DC source for exciter field winding 10. The negative terminal of the DC source provides a voltage reference and may be connected with a system ground 22.

The exciter field winding 10 is connected in series with the collector-emitter circuit of NPN transistor amplifier 17. Terminal 10a of the winding is connected with the positive terminal of the DC source and terminal 10b is connected with the collector element of transistor 17. The emitter element of transistor 17 is returned to the DC reference. A pulse width modulated base drive signal from the voltage regulator 19 is connected with the base element of transistor 17, controlling conduction of the transistor and the current through field winding 10. Diode 23 is connected across field winding 10 and conducts when transistor 17 is shut off to allow the current to continue to flow through the field winding.

Diode 24 is connected across the collector-emitter circuit of transistor 17 and poled to limit the negative potential of the collector element, and thus terminal 10b of the field winding, to one diode drop or approximately 0.5 volts, below the reference potential at the negative terminal of the field current power supply.

Figure 3:
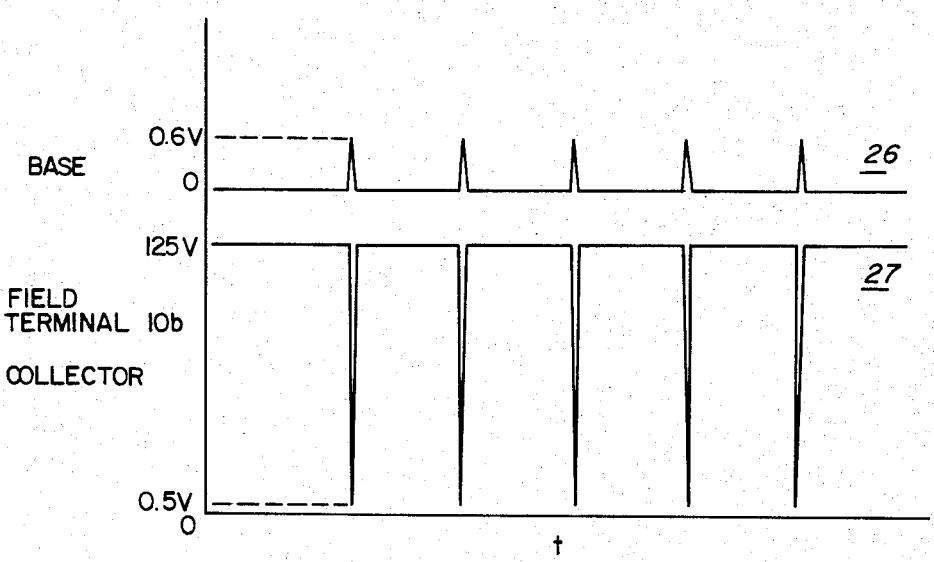
FIG. 3 is a plot of the voltage waveforms at the base of the regulator transistor and at the terminal of the exciter field winding connected with the voltage regulator transistor, in the absence of a shorted diode.

In the absence of a failed diode in the rotating rectifier of the alternator, transistor 17 is driven regularly as shown in FIG. 3. The base drive signal waveform 26 is a series of recurring positive pulses which have a voltage of the order of 0.6 volts. The width of the pulses is established by the voltage regulator 19 to provide an exciter field current which will result in the generation of the desired output voltage from stator 14. The voltage at field winding terminal 10b (the collector element of transistor 17) is shown by waveform 27. During each base drive pulse of waveform 26, transistor 17 conducts and the collector voltage drops to a low voltage, of the order of 0.5 volts positive with respect to the DC reference.

Figure 4:
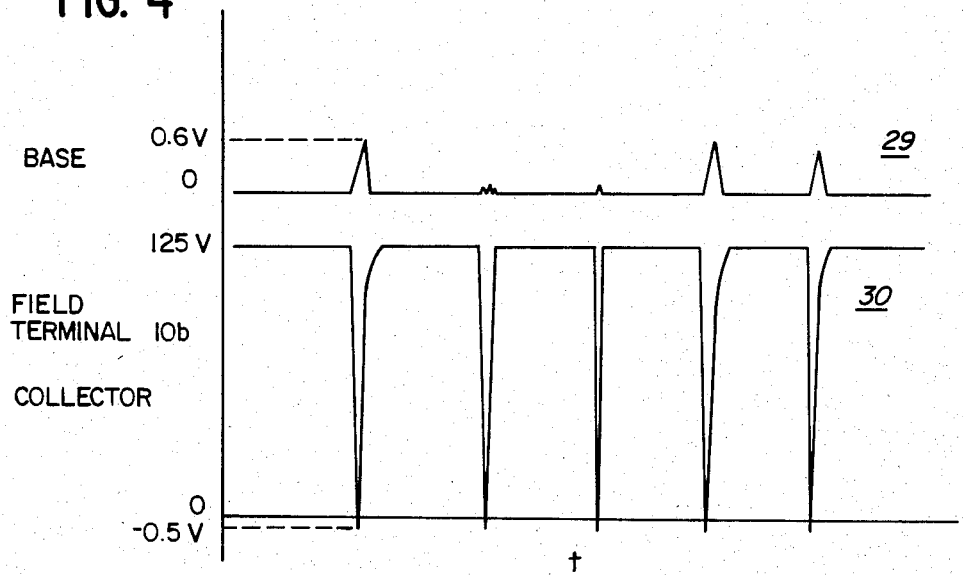
FIG. 4 is a plot of the voltage waveforms at the base of the regulator transistor and at the terminal of the exciter field winding connected with the voltage regulator transistor, with a shorted diode.

When one of the diodes of rotating rectifier 12 is shorted, the stator output voltage tends to drop. As a result, voltage regulator 19 increases the width of the pulses to the amplifier transistor 17. The base drive signal, waveform 29, FIG. 4, becomes irregular. The exciter field winding acts as a voltage source, charging capacitor 21 to a voltage beyond the 140 volt level and back biasing the DC supply. A current flows from terminal 10a of the field winding through capacitor 21 and diode 24 causing the voltage at terminal 10b of the field winding to go one diode drop below ground (e.g., −0.5 volt). As the field winding is serving as the energy source, this occurs with no base drive signal to transistor 17. This condition is monitored to detect occurrence of a shorted diode.

In the embodiment of the detector illustrated in FIG. 2, inverter 32 has its inverting input connected with terminal 10b of field winding 10 (or the collector of transistor 17) and its output connected with one of the inputs of AND gate 33. A second inverter 34 has its inverting input connected with the base element of transistor 17 and its output connected with the other input of AND gate 33. The noninverting inputs of inverters 32, 34 are connected with the DC reference.

In normal operation field winding terminal 10b goes to a ground level only in the presence of a drive signal base of transistor 17. When this occurs, the output of inverter 32 is high that of inverter 34 is low. Accordingly, there is no output from AND gate 33. However, if a diode in the rotating rectifier 12 is shorted, the field terminal 10b goes to a potential at or below the DC reference without a base drive signal to transistor 17. Thus, the outputs of both inverters 32 and 34 are high and the output of AND gate 33 goes high actuating a shorted diode indicator 36. The indicator 36 may be a generator control relay which removes the generator from operation or an alarm that notifies an operator of the malfunction.

We claim:

1. In a brushless alternator having an exciter field circuit including a source of DC potential with a reference, a stationary exciter field winding and a voltage regulator transistor connected in series with the field winding across the DC source, a rotor with an exciter armature, a diode rectifier connected with said armature and a main field winding connected with the diode rectifier, a stator winding in which the alternator output voltage is developed coupled with the main field winding, and a voltage regulator responsive to the alternator output providing a base drive signal to the voltage regulator transistor, an improved detector for a shorted diode rectifier, comprising:

means for comparing the voltage at the base of the voltage regulator transistor and the voltage at the terminal of said stator field winding connected with said voltage regulator transistor; and means responsive to the comparing means for indicating the occurrence of a shorted diode rectifier on said rotor.

2. The shorted diode rectifier detector of claim 1 in which the voltage at said stator field winding terminal is of the order of the DC source reference in the absence of a voltage at the voltage regulator transistor base, indicating occurrence of a shorted diode rectifier.

3. The shorted diode rectifier detector of claim 2 in which said responsive means is a gate circuit having the voltage regulator transistor base voltage connected with one input and the stator field winding terminal voltage connected with another input.

4. The shorted diode rectifier detector of claim 1 including:
   a first inverter connected with the stator field winding terminal;
   a second inverter connected with the voltage regulator transistor base; and
   an AND gate having two inputs, one connected with the output of each of said inverters, the output of the AND gate being high upon occurrence of a shorted diode rectifier.

5. In a brushless alternator having an exciter field winding, a rotor with an exciter armature, a diode rectifier connected with the armature and a main field winding connected with the rectifier, a stator winding in which the alternator output voltage is developed, coupled with said main field winding and a voltage regulator responsive to the alternator output providing a field current control signal, a field circuit with a detector for a shorted diode rectifier, comprising:
   a DC power source with a reference;
   a voltage regulator transistor having a collector-emitter circuit connected in series with said exciter field winding across said DC potential source, and a base element connected with said voltage regulator to respond to said field current control signal;
   means for comparing the voltage at the base of the voltage regulator transistor and the voltage at the terminal of said stator field winding connected with the emitter-collector circuit of said voltage regulator transistor; and
   means responsive to the comparing means for indicating the occurrence of a shorted diode rectifier.

6. The shorted diode rectifier detector of claim 5 in which the voltage at said stator field winding terminal is of the order of the DC source reference in the absence of a voltage at the voltage regulator transistor base, indicating occurrence of a shorted diode rectifier.

7. The field circuit of claim 6 including a diode connected in parallel with the collector-emitter circuit of said voltage regulator transistor and poled to conduct a current of opposite polarity to the current conducted through said transistor.

8. The exciter field circuit of claim 6 including a diode connected across said field winding and poled to conduct current from the field winding upon termination of a field current control signal to the base element of the voltage regulator transistor.

9. The alternator field circuit of claim 6 including a capacitor connected across said DC power source.

10. The alternator field circuit of claim 6 including:
    a capacitor connected across said DC power source;
    a diode connected in parallel with the collector-emitter circuit of said voltage regulator transistor and poled to conduct a current of opposite polarity to the current conducted through said transistor; and
    a diode connected across said field winding and poled to conduct current from the field winding upon termination of a field current control signal to the base element of the voltage regulator transistor.

11. In a brushless alternator having an exciter field circuit including a source of DC potential with a reference, a voltage regulator transistor and a stationary exciter field winding having one terminal connected with the DC source and the other terminal connected in series with the collector-emitter circuit of the voltage regulator transistor to the DC source reference, a rotor with an exciter armature, a diode rectifier connected with said armature and a main field winding connected with the diode rectifier, a stator winding coupled with the main field winding and in which the alternator output voltage is developed, and a voltage regulator responsive to the alternator output to control the voltage regulator transistor, an improved detector for a shorted diode rectifier, comprising:

a comparator responsive to the occurrence of a voltage at the other terminal of the stator field winding of the order of the DC reference voltage in the absence of a voltage regulator transistor base drive signal, for detecting a shorted rotating diode condition.

12. In a brushless alternator having an exciter field winding, a rotor with an exciter armature, a diode rectifier connected with the armature and a main field winding connected with the rectifier, a stator winding in which the alternator output voltage is developed, coupled with said main field winding and a voltage regulator responsive to the alternator output providing a field current control signal, a field circuit with a detector for a shorted diode rectifier, comprising:

a DC power source with a reference;

a voltage regulator transistor having a collector-emitter circuit connected in series with said exciter field winding across said DC potential source, and a base element connected with said voltage regulator to respond to said field current control signal;

a capacitor connected across said DC power source;

a diode connected in parallel with the collector-emitter circuit of said voltage regulator transistor and poled to conduct a current of opposite polarity to the current conducted through said transistor; and a comparator responsive to the occurrence of voltage, at the stator field winding terminal connected with the collector-emitter circuit of the voltage regulator transistor of the order of the DC reference voltage in the absence of a base drive signal to the voltage regulator transistor, for detecting a shorted rotating diode condition.

* * * * *